(No Model.) 8 Sheets—Sheet 1.

W. J. PERKINS.
SHINGLE SAWING MACHINE.

No. 387,441. Patented Aug. 7, 1888.

Fig. 1.

Witnesses,
Jos. S. Latimer.
C. W. H. Brown.

Inventor,
Willis J. Perkins.
By his Attorney
Wallace A. Bartlett.

(No Model.) 8 Sheets—Sheet 5.

W. J. PERKINS.
SHINGLE SAWING MACHINE.

No. 387,441. Patented Aug. 7, 1888.

Witnesses
Jos. S. Latimer
C. H. H. Brown

Inventor
Willis J. Perkins
By his Attorney
Wallace A. Bartlett (No Model.) 8 Sheets—Sheet 6.

W. J. PERKINS.
SHINGLE SAWING MACHINE.

No. 387,441. Patented Aug. 7, 1888.

Witnesses:
C. W. H. Brown.
M. L. Williams.

Inventor:
Willis J. Perkins,
By his attorney
Wallace A. Bartlett, (No Model.) 8 Sheets—Sheet 7.

W. J. PERKINS.
SHINGLE SAWING MACHINE.

No. 387,441. Patented Aug. 7, 1888.

Witnesses:
C. W. H. Brown,
M. L. Williams.

Inventor:
Willis J. Perkins,
By his attorney
Wallace A. Bartlett.

UNITED STATES PATENT OFFICE.

WILLIS J. PERKINS, OF GRAND RAPIDS, MICHIGAN.

SHINGLE-SAWING MACHINE.

SPECIFICATION forming part of Letters Patent No. 387,441, dated August 7, 1888.

Application filed June 9, 1886. Serial No. 204,635. (No model.)

*To all whom it may concern:*

Be it known that I, WILLIS J. PERKINS, residing at Grand Rapids, in the county of Kent and State of Michigan, have invented certain new and useful Improvements in Shingle Sawing Machines, of which the following is a specification, reference being had therein to the accompanying drawings.

This invention relates to shingle-sawing machines; and the object of the invention is to improve the various parts of the machine.

The invention consists in a double-block machine having mechanism by which the carriages may be stopped at a predetermined place for the removal of the spalt; also, in an improved crank or wrist-pin connection for taking up wear; also, an improved driving mechanism to equalize the power at both sides of the carriage and prevent binding; also, an improved carriage having adjustment to regulate distance between holding-dogs; also, in the construction of the dogs, and bracing them, and shielding the saw against damage by said dogs; also, in the mechanism by which the saw-arbor is supported and adjusted; also, in the improved and simplified adjusting mechanism of the tilt-table; also, in the mechanism for controlling or stopping the movement of the machine; also, in details of construction and combinations of parts hereinafter specified in the claims.

Fig. 6 is a plan detail showing the carriage and dogs.
Fig. 7 is a detail elevation of the mechanism for adjusting the holding-dog.
Fig. 7ª is a detail of part of the connections by which the dog is operated by the hand-lever.
Fig. 8 is an end elevation of one of the carriages.
Fig. 9 is a cross-section of the holding-dog.
Fig. 10 is a plan, partly in section, of the upper saw-arbor bearing and girt.
Fig. 11 is a plan, partly sectioned, of the lower saw arbor bearing and girt.
Fig. 12 is a horizontal section of the ball-bearing and box of the saw-arbor.
Fig. 13 is an elevation of the same.
Fig. 14 is a section and partial elevation of the saw-arbor and its bearings.
Fig. 16ª is a section through the cap surmounting butt and point screws.

This shingle-sawing machine is what is known as a "double-block" machine, in which the horizontal circular saw is made to cut shingles from the lower surface of two shingle-bolts, the machine having two carriages, each containing a shingle-bolt. One carriage is made to advance toward the center of the saw from one side of its arbor and the other carriage from the other side. Each carriage is adapted to move alternately over a tilting table and the saw. When the carriage is over the tilting table the bolt is undogged and drops on the table. Immediately as carriage moves toward the saw the block is dogged.

The numeral 1 indicates the frame of the machine, and 2 the driving-pulley from which the carriages are driven. The saw 4 on arbor 5 is driven by a belt on pulley 3. It is essential that the saw 4 shall be adjustable to an exactly horizontal position, and to this end the arbor 5 is hung in bearings which permit adjustment in every direction. As the regular strain of the driving-belt tends to draw the arbor from the perpendicular, and as the intermitting pressure of the shingle-bolts against opposite sides of the saw has a similar tendency, the supports of the arbor must be very strong as well as readily adjustable.

Figures 6, 7, 7A, 8, 9, 10, 11, 12, 13, 14:
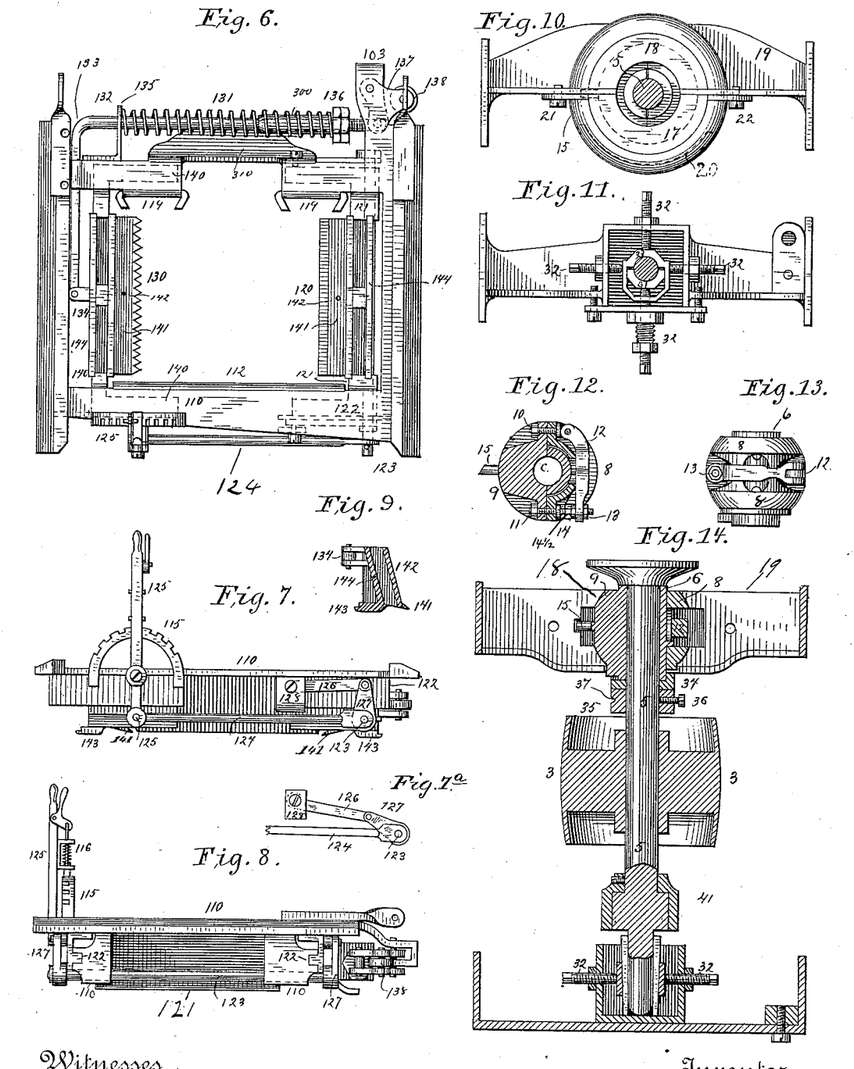

In the present machine the upper journal-box, 6, is provided with a lubricating-well. One half of box 6 is formed in the spherical section 9. The other half is adapted to slip inside of the section 8. This spherical portion or shell is in two parts, 8 and 9, and is securely fastened together by bolts 10 and 11, which are seated in sunken portions of the shell or sphere below its surface. The bolt 10 has a bar, 12, pivoted to one end, (see Figs. 12 and 13,) and bar 12 has an eye which passes over the end of bolt 11 and is secured by nut 13. This bar 12 lies in a recess in the general surface of the sphere, and at its center bears on the journal-box cap 6 or on projections therefrom, the central portion of half-shell 8 being cut away and two lugs on the box 6 entering the cut-away portion to prevent the box having longitudinal motion in the spherical shell. A set-nut, 14, on bolt 11 determines the innermost position of the bar 12 when adjusted. Set-nut 14½ locks 14 when adjusted. The half-shell 9 has a projecting pin or lug, 15, to maintain it in proper rotary position in matrix 17 and 18. The bar 12, when adjusted by nuts 13, 14, and 14½, determines the relative position of the journal-box cap on the arbor.

The shell 8 and 9, forming practically a sphere, fits into a spherical box or seat, 17 and 18, on the upper girt, 19, of the frame. The inner surface of this box precisely fits the spherical exterior shell, 8 9. The half-matrix 17 is slotted circumferentially horizontally for a little distance (see Fig. 10) at 20, so as to provide wrench-room to turn nuts 13 14 14½. The half-matrix 17 is secured by bolts 21 and 22 to the cross-girt 19 and to the balance of matrix 18.

When the arbor is to be adjusted the matrix 17 is loosened and the lower end of the arbor moved by its adjusting-screws. The upper ball-bearing will then align itself, the bearing of the journal-box on the arbor remaining undisturbed.

The bottom of the arbor 5 runs in split box 31, which is supported from each cardinal direction by screws 32, which bear on the yoke 33, wholly or partially surrounding the said journal-box 31. The adjustment of lower end of arbor 5 may thus be made in any direction by means of the set-screws, the upper end rocking in its ball-supported matrix, as described. This lower bearing-box is fully described and claimed in my application No. 174,643. To hold the arbor firmly on the step, the saw-arbor 5 has a loose collar, 34, which bears against the lower end of the sphere holding upper journal-box, and a lower collar, 35, secured firmly to the arbor, as by a set-screw, 36. The collar 34 serves to collect the oil-drip from box 6, assisting in the lubrication of wearing-face of collar 35. Collar 34 also serves to diminish risk of heating the parts, and presents an even wearing-surface to the journal-box and to the fixed collar 35. The collar 35 has a groove, 37, in its periphery, by which a grasp may be had on the collar, as with a lever, to shift the collar longitudinally on the shaft. The same groove affords a seat for a tool or block against which to drive to move the collar. In place of a depression a ridge could be substituted and answer equally as well.

Figure 3:
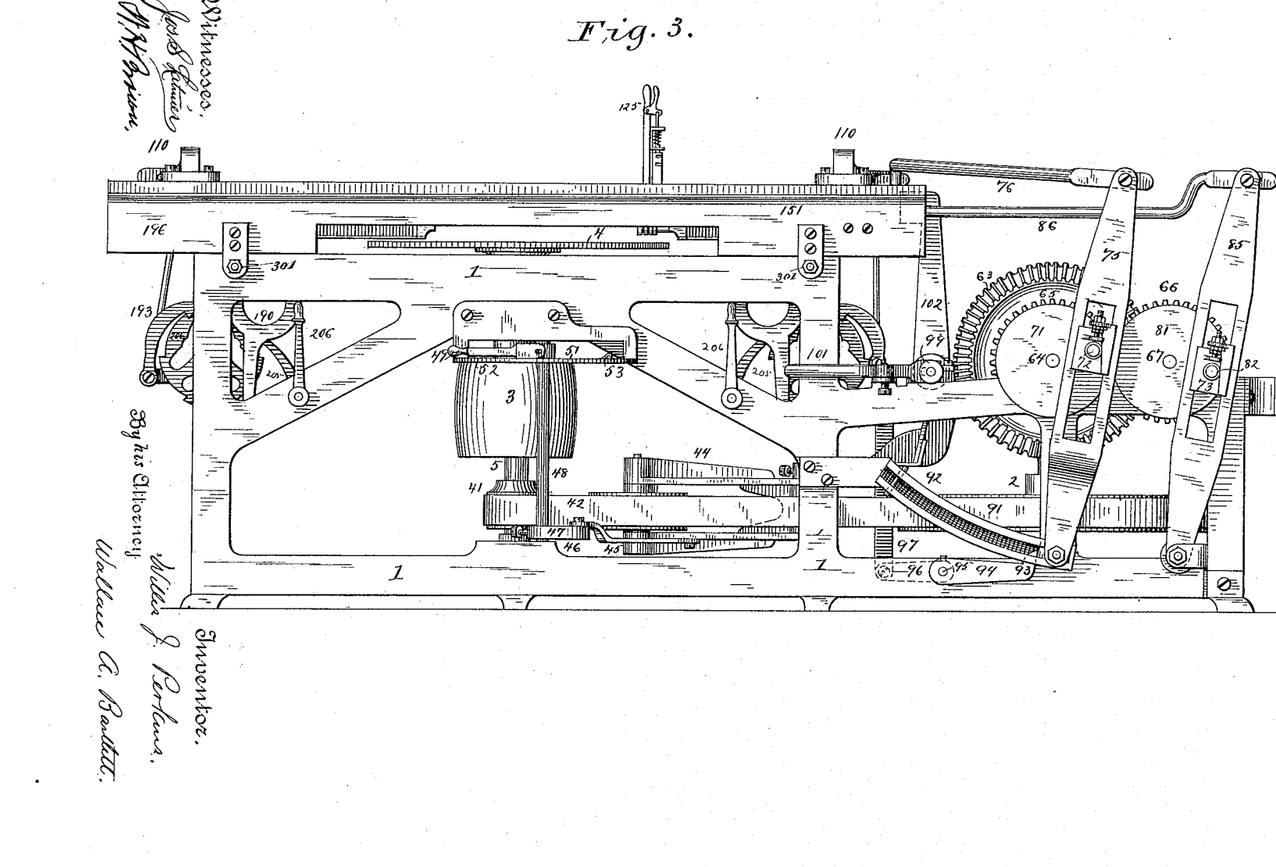
Fig. 3 is a front elevation of the machine.

The pulley 41 on arbor 5 transmits power to pulley 2 by means of belt 42. An idler-pulley, 43, supported in a swinging frame, 44, serves to tighten or loosen the belt 42, so that the carriage-driving gear may be started or stopped without interfering with the movement of the saw. The frame 44 is connected by link 45 to arm 46 of lever 47. (See Figs. 3 and 17.) Arm 47 is secured to vertical rock-shaft 48, which is supported in bearings in the frame. The top of shaft 48 has a hand or knee lever, 49, pivoted thereto. This lever swings on the face of sector-plate 51, which has projection 53 at one end. A spring or weight is arranged to place frame 44 under constant tension in the direction of the arrow $a$, Fig. 17, to tighten the belt, the sawyer moving handle 49 in reverse direction to arrow $a$ to loosen the belt and stop machine.

Figures 16, 16A, 17:
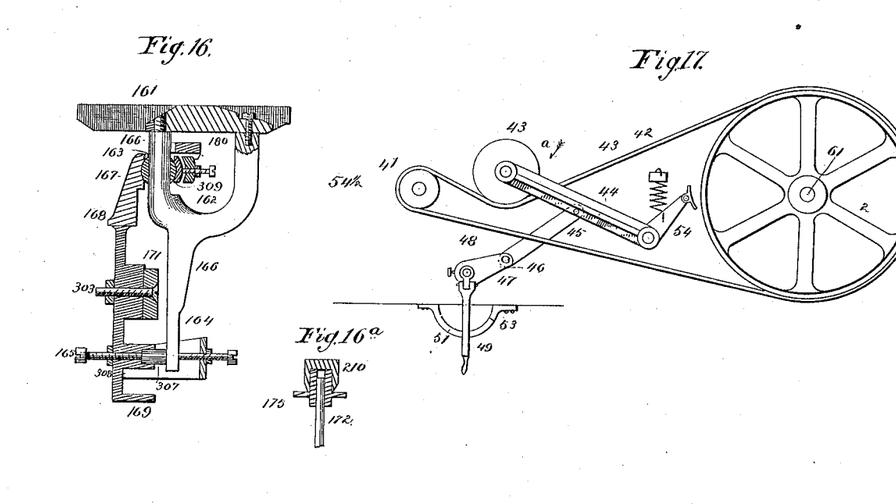
Fig. 16 is a detail of the tilt-table, partly in section and partly in elevation, showing the universal adjustment.
Fig. 17 is a plan diagram showing the relative position of the carriage-driving belt and its pulley and brake.

When the lever 49 is shifted to the end of sector 51, so as to engage with catch or tooth 53, besides loosening the belt, the movement applies the brake 54 to the surface of wheel 2, thus instantly stopping the carriage-driving gear in any position. Brake 54 is hung to frame 44 at the side of its fulcrum opposite the idler 43 and to one side of a line drawn through 54½ and 61.

Figure 4:
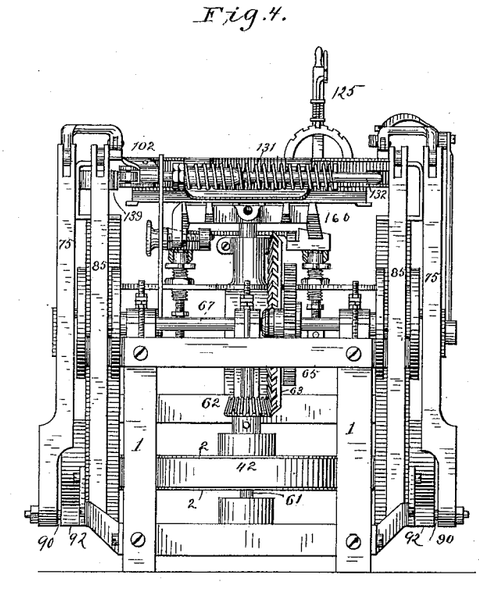
Fig. 4 is an end elevation of the driving end of machine.

The pulley 2 is attached to shaft 61. To shaft 61 is fastened bevel-pinion 62, engaging bevel-gear 63 on shaft 64, Figs. 1, 4. A gear, 65, on shaft 64 drives gear 66 on counter-shaft 67, all the shafts being suitably supported on frame 1. Gear 65 is rigidly fastened to bevel-gear 63.

Shafts 64 and 67 carry at their outer ends crank-disks. Crank-disks 71 on shaft 64 have crank-pins 72 projecting outwardly therefrom. (See Figs. 2 and 3.) These crank-pins are journaled in boxes 73, which slide in slots 74 of the crank-levers 75. The upper end of each crank-lever 75 is connected by pitman 76 with the shingle-bolt carriage. A corresponding connection is made from the shaft 67 through crank-disks 81 and crank-pins 82 to the crank-levers 85, which are connected by pitman-rods 86 with the other shingle-bolt carriage. Thus each shingle-bolt carriage has a double connection to its driving-shaft, one connection at each end of the carriage; so there is no tendency of the carriages to bind in the ways due to unequal pressure of the propelling mechanism. The lower end of crank-lever 75 is pivotally attached to a rectangular box, 90, Figs. 2, 3, and 4, which fits and slides in curved slot 91 in a plate, 92, fastened to the frame 1, the curve of the slot being struck of proper radius to admit of free working of box 90 in slot 91. A stop, 93, when in normal position, enters the curved slot 91 and prevents the box 90 from moving in said slot. The stop 93 is formed on arm 94, secured to rock-shaft 95. Rock-shaft 95 has an arm, 96, (dotted lines, Fig. 2,) to which a link, 97, is pivoted. This link 97 is pivoted at its upper end to an arm, 98, on shifting-bar 99.

Figure 1:
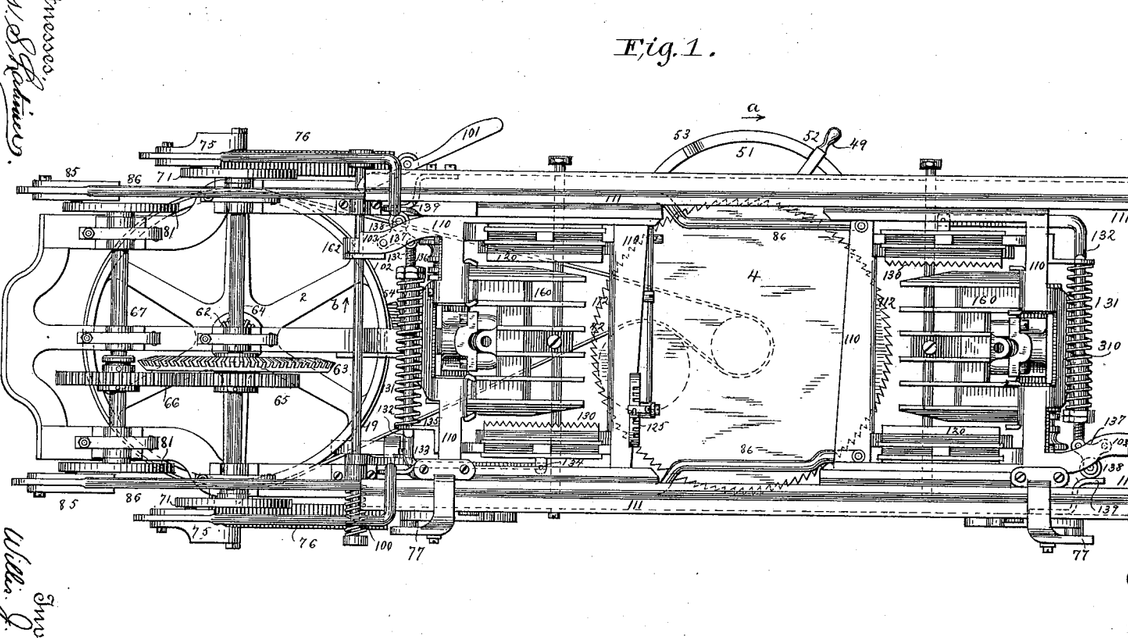
Figure 1 is a plan of the sawing-machine according to this invention, parts being omitted for convenience of illustration.

The shifting-bar 99 is held normally in the position shown in Fig. 1 by the spring 100; but by the movement of lever 101 this bar may be drawn in the direction of arrow $b$, Fig. 1, and in such position its upwardly-projecting arm 102 will be in the line of movement of the projection 103 on the shingle-bolt carriage. (See Figs. 1, 2, and 3.)

When the operator desires to stop the movement of the carriage at the completion of its backward stroke, he shifts lever 101 so that arm 102 is in line of movement of projection 103. When the carriage moves back, so as to engage this arm, it rocks the bar 99 on its axis. This in turn rocks shaft 95 and draws down the stops 93. The lower end of the crank-arms 75 is thus released, the carriage remaining at rest and the crank-arms moving on the stationary pivots 79.

Figure 18:
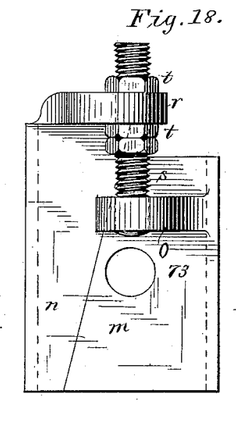
Figs. 18 and 19 are details showing the sliding box that receives the wrist-pin that drives the crank-arms.
Figure 19:
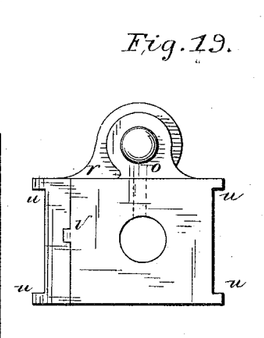

There is considerable wear on the sliding bearing-pieces 73, into which the crank-pin journals. To take up this wear the pieces 73 are made in two wedge-shaped parts, $m$ and $n$. (See Figs. 18 and 19.) The part $m$ has a projecting lug, $o$, from its face, and the part $n$ has a lug, $r$, projecting from one side in line with lug $o$. A stud-bolt, $s$, from the lug $o$ passes through lug $r$, and set-nuts $t$ on said bolt permit the two wedge-pieces to be adjusted relatively to each other by drawing on the bolt, thus increasing the width of the bearing-piece. Lug $r$ is slotted to permit of free lateral motion of bolt $s$ when $m$ and $n$ are adjusted. The bearing pieces have side flanges, $u$, as usual, to hold them in the slots in the crank-arms, and a tongue and groove, $v$, keeps the two parts in alignment with each other. By turning the nuts on bolt $s$ the sections may be adjusted longitudinally, and thus the entire block be made wider or narrower, as desired, to compensate for wear.

The carriages 110 are of the usual rectangular form; but the frame of each is of a single piece of cast metal, preferably cast-steel. The frames slide in the ways 151, each carriage being driven from its crank-arm by connections hereinbefore described, it being within the power of the operator to stop either carriage or both by the mechanism already explained.

Each carriage 110 has in machines of usual construction a fixed dog at one end, and each carriage has a movable dog at the other end, by which dogs the bolts are held while being sawed. In the present machine I make an adjustable dog, 120, take the place of the usual fixed dog in one of the carriages. This dog 120 is movable to adapt it to shingle-bolts which differ in length from the normal bolt, and remains in that position until necessary to change again. One of the carriages may have one fixed dog, and is thus adapted to hold shingle-bolts of ordinary length. The self-adjusting or spring dog 130 fastens itself into the end of the shingle-bolt opposite the dog 120 at the proper interval in the movement of the carriage.

The inner faces, 112, of the carriages are formed by an upright wall of the frame of said carriages, and serve as a rest for the bolts and cover and protect the dog-operating mechanism from sawdust.

The adjustable dog 120 is borne on a cross-bar, 121, which has side wings, 122, parallel with the outer front and rear faces of the carriage 110, and having tongue-and-groove engagement therewith. (See Fig. 8.) A rock-shaft, 123, extends behind this dog in proximity to cross-bar 121, and a connecting-rod, 124, pivoted to lever 125, connects rock-shaft 123 with said lever. Connecting-rod 124 is pivotally attached to rock-shaft. Links 126 and arms 127 connect the opposite ends of rock-shaft 123 to pivots 128, fastened in the frame of the carriage. Arms 127 are rigidly fastened to rock-shaft. As the arms 127 are rigid with the rock-shaft, and as these arms are pivoted to links 126, it follows that a horizontal movement of rock-shaft 123 must produce a partial rotation of the shaft on its axis, and this rotation must cause the arms 127 to swing through similar arcs. Consequently, unless there is a twisting of the rod 123, any horizontal movement of one part of the rod must be equal at both ends. The rod is supported in the carriage so that the movement is horizontal, the links 126 permitting a compensating movement to arms 127. The lever 125 has a spring-catch, 116, engaging notched sector-plate 115. (See Figs. 7 and 8.)

By shifting the lever 125 connecting-rod 124 moves proportionally, carrying with it rock-shaft 123. As the one end of each arm 127 is fastened to carriage side by links 126, it rotates shaft 123, thereby transmitting an equal amount of motion to the other end of dog 120. The dog 120 is adjusted to such position when a shingle-bolt is put in the carriage that the movement of the dog 130 under the impulse of its spring will be sufficient to grasp and release the shingle-bolt with each movement of the carriage.

The movable dog 130 (see Figs. 1 and 6) is drawn inward toward the dog 120 by spring 131 on rod 132, which has an elbow, 133, and is attached to a projection, 134, in rear of dog 130. The spring 131 bears against bracket 135 on the carriage, and its tension may be adjusted by nuts 136, engaging thread on rod 132.

300 is a sleeve to prevent spring 131 from coming in contact with thread on rod 132.

The end of rod 132 is pivoted to a bell-crank lever, 137, hung in projection 103 of the carriage, and this lever has an anti-friction roll, 138, which strikes an incline, 139, on the frame when the carriage is at the rearmost part of its movement, this mechanism serving to shift the rod 132 endwise, move back dog 130, thereby releasing the shingle-bolt as the carriage gets to the extreme of its rearward movement, but permitting the dog 130, by the force of the spring 131, to clamp the shingle-bolt as soon as the carriage begins to move forward.

By locating the incline 139 on the side of the frame opposite the spring-dog 130 the dog and carriage are pressed back by said incline, thus correcting the tendency to bind between the carriage and frame, due to the direction of rotation of the saw.

The dog 130 is guided in the carriage 110 by side bars, 140, (shown in dotted lines, Fig. 6,) which bear against the inner surfaces of the front and rear walls of the carriage, precisely as do the guide-pieces 122 on the opposite dog, 120.

The dogs 120 and 130 are each made of angle-formed bars standing at an incline, the teeth or engaging edge 141 (see Fig. 9) extending inward from the front inclined bar, 142, and the guard 143, somewhat thicker, extending to the rear of the rear bar, 144, and below the plane of engaging-edge 141. The side of the carriage next the dog-spring—that is, away from the saw—has two beveled receptacles, 119, for retaining adjustable blocks therein.

It will be observed that all the operating-gear of the dogs is outside the frame of the carriage, and is protected by the frame and covered from sawdust, &c., and the moving parts do not come in contact with the shingle-bolt.

The return projections 143 below the level of the dogs serve as guards to prevent the contact of the saw-teeth with the engaging-edge of the dogs. These guards present a flat surface of greater width than the distance from point to point of the saw-teeth. If by the springing up of the saw it comes in contact with the guard, the contact-surface, being wide, would knock the upper edge of the teeth off, but they could not catch onto it, while if they came in contact with the narrow angling-edge of engaging part of the dog they would and do catch and damage the saw badly, the individual teeth springing up and catching on the thin edge of dog.

Figure 5:
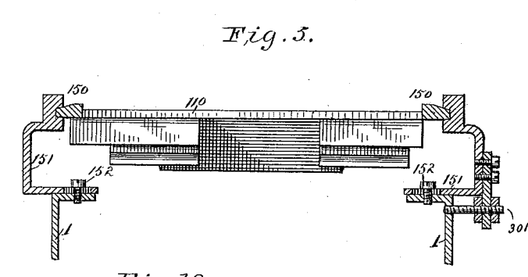
Fig. 5 is cross-sectional view of the rear end of the upper part of frame and carriage.

The side guides, 150, of the carriage 110 (shown diagrammatically in section in Fig. 5) are beveled in their top faces and slide in similar-shaped grooves in the guide-bars of the frame. These bars 151 are angle-bars adjustable laterally on top of frame 1 by means of bolts 301, bolts 152 being slackened while adjustment is made and then tightened. Thus wear may be taken up by simply moving in one or both of the guide-bars toward the carriage. The bearing, being on an angle, takes up the vertical and lateral slack simultaneously.

Immediately under each carriage 110, when in position clear of the saw, there is a tilt-table, 160, on which the shingle-bolt rests when not held by the dogs in the carriage. This tilt-table in the present case has a top grating, 161, which is supported on the universally-pivoted yoke 162, the preponderance in weight of the grating and yoke being at one side of the ball-pivot 167. The weight throws the bottom 164 of the standard of said yoke in the direction of the anti-friction bearing-block 307, it being adjustably supported on screw 165. The grating 161, yoke 162, and post 166 may be integral or may be of separate pieces rigidly secured together.

308 is jam-nut on screw 165. The adjustment of screw 165 swings bottom of standard out or in, and determines the horizontal alignment of grating 161 with the top sliding ways, 150, Fig. 5.

The ball-pivot 167 permits a rocking of post 166 within the socket 167 in all directions, also a sliding vertical motion, but holds it rigidly against transverse and lateral motion.

The standard 168, in which socket 163 is made, is supported on cross bars or girts 169 and 170 of the frame, and these bars are braced by standard 168, connecting them.

163 is a split ball having rotating bearing in the socket 167 and forming sliding bearing for the vertically-movable post 166.

309 is an adjustable cap for taking up the wear of ball 167 in its socket and wear of post 166 in the ball.

Figure 15:
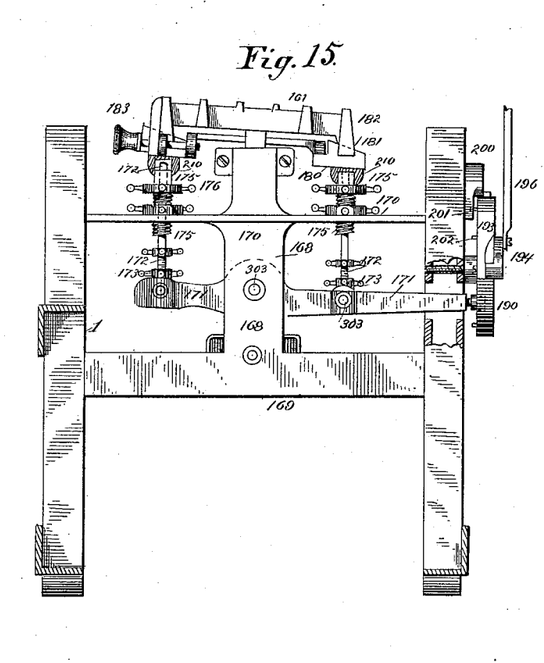
Fig. 15 is a cross-section of part of the machine, showing one of the tilt-tables in elevation.

A walking-beam, 171, is pivoted on pin 303, which is rigidly fastened to standard 168, as shown in Figs. 15 and 16. This walking-beam has a screw, 172, at each side of its vibratory center, said screw being vertically adjustable by means of thread engagement with the pivotal nut 302 and may be held by jam-nut 173.

The screws 172 pass entirely through the hollow screws 175, which are supported in the girt 170 and are vertically adjustable relatively to said girt by means of screw-thread in said girt.

176 is a jam-nut on screw 175.

Between the tops of the screws 172 and 175 and the bottom of the grating there is a piece, 180, which has inclines 181 on its upper surface bearing against similar inclines 182 at the bottom of the grating. This piece 180 can be moved laterally by the screw 183, engaging therewith and with the grating, and the distance from top of grating to the bottom of piece 180 will be correspondingly increased or diminished. The two ends of the piece 180 have similar bearings against the grating, and thereby the entire thickness of shingle is correspondingly changed.

The screws 172 are alternately thrown up by the rocking of the walking-beam 171 on its pivot 303, and by this means the table or grating is tilted, the most elevated side of the tilt-table being that on which the end of the shingle-bolt rests, from which the point of the shingle will be sawed. The lower side of the table or grating, at the right hand, Fig. 15, rests on the piece 180, which in turn rests on the screw 175, thus determining the thickness of the shingle-butt.

Figure 21:
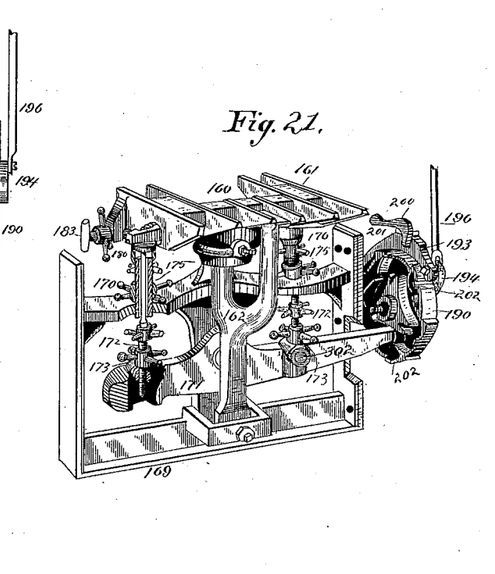
Fig. 21 is a perspective view of the tilt-table and its supports and operating-cam.
Figure 22:
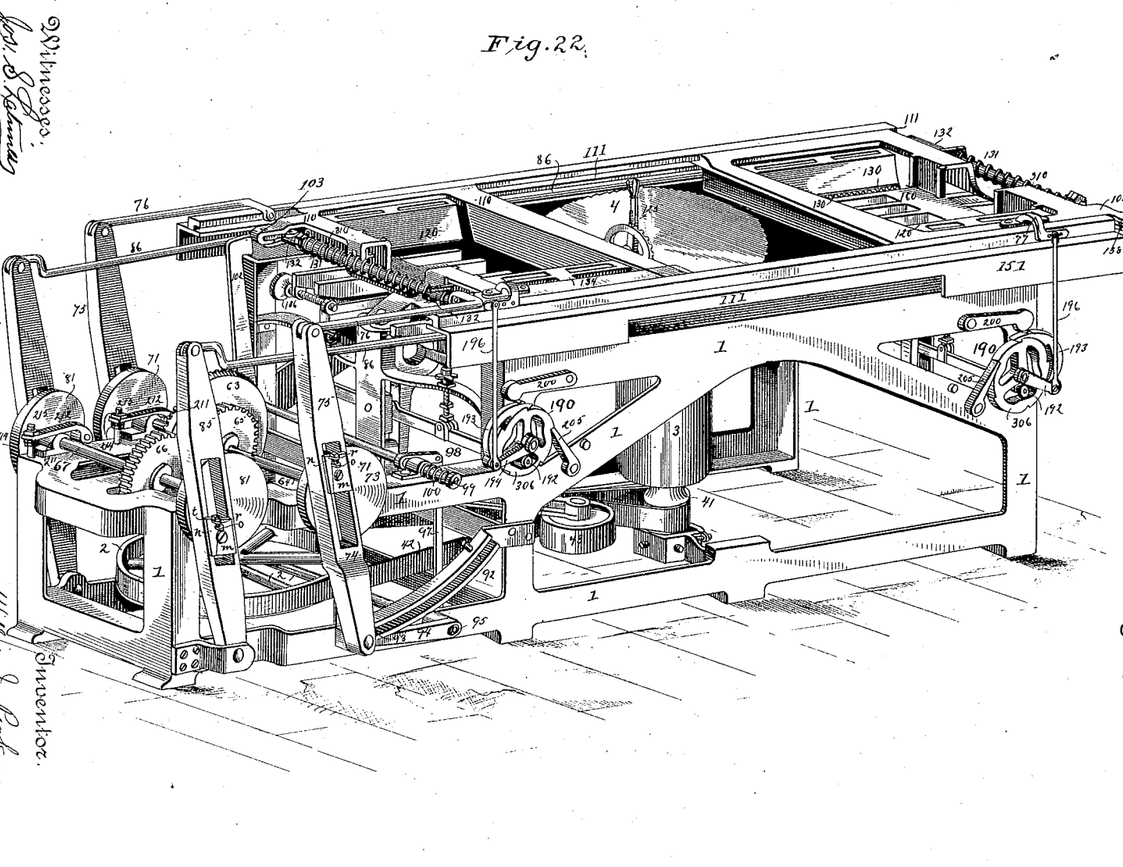
Fig. 22 is a perspective of the machine.

The oscillation of walking-beam 171 is caused by the ratchet-wheel 190, which has cam-surfaces 191, (see Figs. 2, 3, and 21,) engaging on anti-friction roll 192 at the outer end of said walking-beam. The ratchet 190 is caused to rotate a distance sufficient to raise or lower the end of the walking-beam by a pawl, 193, pivoted on lever 194, which is concentric with ratchet 190. The swing of this lever is caused by the link or rod 196, which is pivoted to the lever and also pivoted to the carriage 110, the backward and forward movement of the carriage, as hereinafter described, operating the pawl to turn the ratchet-wheel.

Figure 2:
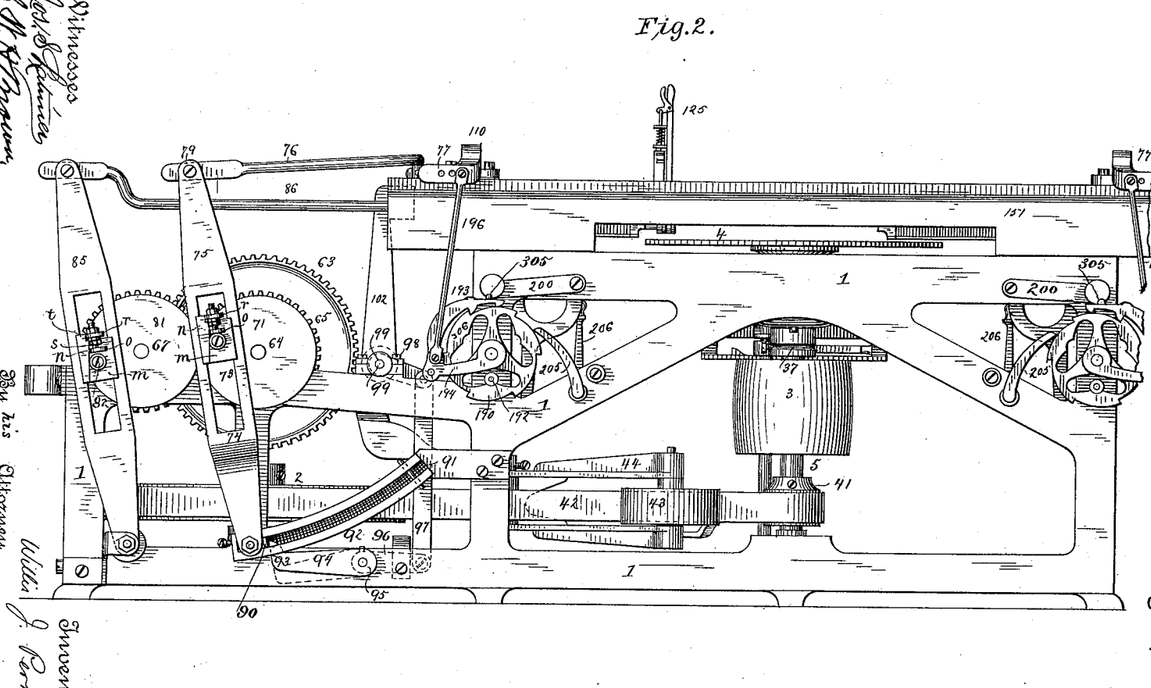
Fig. 2 is a rear elevation of the machine.

The cam-ratchet 190 has its cam-faces so formed as to retain the end of walking-beam at the top or bottom of the cam by means of depressions in its cam-faces. These depressions 306 are shown in Fig. 2.

The travel of pawl 193 is determined by a perpendicular drawn through the center of its pivotal connection with link 196 relative to the rectilineal movement of the carriage. It is desirable to finish the tilting of the table before the back-stroke of the carriage is completed. The perpendicular is drawn at such place that the majority of the backward motion of carriage is utilized to tilt with, and before the bolt is undogged the tilting is completed, the balance of motion simply drawing pawl away from ratchet. The connection of this link with the carriage may be made at various points. (See Fig. 2.) A cup, 210, intermediate between the screws and the incline piece 180, serves to protect the screws from sawdust and forms a common seat for them to bear against and a guide with center bearing, 167, to prevent the table 160 from rotating.

As the carriage moves forward in the act of sawing a shingle the upper end of link 196 is carried forward. The lower end, being fastened to lever 194, rotates said arm on its center proportionately to the amount of rectilinear movement of the carriage and upper end of the link 196. The pawl 193 moves forward, falling over the next succeeding ratchet-tooth on cam 190. At the same time the incline on the upper surface of pawl 193 has raised the locking-dog 200 clear of the projection 202 on the ratchet-wheel 190. On the return of the carriage the pawl 193 is actuated by link 196 and engages ratchet-wheel 190, partially rotating the same, and by means of cam-surfaces 191 the walking-beam 171 is rocked on its pivot 303, thus elevating the screw 172 at one side of the machine, and depressing the opposite screw, 172. The elevation of one screw or riser 172 raises that side of the tilt-table off from the screw or adjustable support 175, and the greater part of the weight of the tilt-table and the bolt supported by it rests on this screw or riser and the walking-beam, the remainder of the weight being supported by the screw 175 at the depressed end of the tilt-table.

As the preponderance of weight of the tilt-table is transferred to the alternate sides of the pivot 303 of the walking-beam 171, it follows that the weight in each case is utilized to lock the ratchet cam-wheel 190 at a position determined by the depressions at the apexes of the cam-faces in said ratchet-wheel. Consequently the cam imparts a regular amount of elevation to the screw 172, which supports the elevated end of the tilt-table. To vary this elevation, and thus determine the thickness of the shingle-points, the screws 172 are turned up or down, increasing or diminishing the lost motion between the ends of these screws and the caps 210, necessitating a greater or less amount of travel of each of the screws 172 before they begin to raise the tilt-table off the respective screws 175.

The locking-dog 200 is pivoted to the frame and has an arm, 201, which extends into engagement with projection 202 on the inner edge of the ratchet-wheel (see Fig. 21) to prevent the momentum of the wheel carrying it round too far under the impulse of the pawl. As the dog 200 is directly above the pawl 193, and its projection 305 rides on said pawl, the dog is lifted out of engagement with the ratchet-wheel by the cam shape of the top of the pawl, except at the instant the pawl has reached the extreme of its movement, when the locking-dog locks the ratchet-wheel. The movement of the pawl serves to lift the locking-dog as it moves over the ratchet-teeth during the forward movement of the carriage. The rotating pawl 193, Fig. 2, engages cam-ratchet 190 and may be prevented from engagement with the said ratchet by means of lever 206, which is secured to the pivotal shaft on which is fastened the intermediate pawl 205, and on the opposite side of the frame to it, so as to be convenient to the operator.

Figure 20:
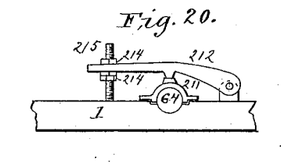
Fig. 20 is a detail of one of the crank-shaft bearings.

The shaft 64 has a bearing in frame 1 and is covered by cap 211, which is held down by lever 212. (See Fig. 20.) This lever 212 bears only at the middle of the cap and is held down by nuts 214 on screw 215.

The saw-carriage 110 is cut away in its upper central surface at 310, to permit the operator to more readily insert his hand to remove the shingle-bolt or spalt.

It will be understood that changes of construction by the substitution of known mechanical equivalents may be made without departing from the spirit of my invention.

I claim—

1. In a shingle-sawing machine, the combination, with the saw-arbor, of a universally laterally-movable bearing near one end of said arbor and a universally rotarily-movable bearing near the other end of said arbor.

2. In a shingle-sawing machine, in combination with the saw-arbor, a bearing at one end movable laterally in all directions and a ball-and-socket bearing near the other end of said arbor.

3. In combination with the arbor of a shingle-sawing machine, a bearing near one end adjustable laterally in all directions, a bearing near the other end, a divided spherical shell surrounding said bearing, and a spherical seat in the frame for said shell.

4. In combination with a saw-arbor having a cap laterally adjustable, a segment of a sphere forming the other bearing, a spherical segment outside the cap, and a bar lying in a recess in the segment and bearing on said cap.

5. In combination with a saw-arbor, a cap on said arbor, a spherical shell within which the cap is movable, a pivoted bar lying in a recess in said shell and bearing on the cap, and an adjusting-screw by which the position of the bar may be regulated.

6. In a sawing-machine, the combination, with the arbor horizontally adjustable in all directions at one end and adjustable in a ball at the other end, of a divided matrix on the frame of the machine to receive said ball.

7. The combination, with the tilt-table and the rolling bearing, said table being vertically adjustable relatively to said bearing, of the adjustable side supports for said table, substantially as described.

8. The tilt-table having inverted cups at its under surface to prevent the entrance of saw-dust, combined with the butt-supports which enter and fit said cups, and the point-actuating risers which pass through the butt-supports and enter the cups, substantially as described.

9. In a shingle-sawing machine, the combination, with the frame having a pair of reciprocating carriages thereon, of two pairs of crank-arms at the outer sides of one end of the frame, each pair of arms being connected to one of the carriages, and cranks engaging said arms, as set forth.

10. In a shingle-sawing machine, the frame, the reciprocating carriage, the driving mechanism connected to said carriage, and a movable catch in position to engage or disengage the driving mechanism, whereby the driving mechanism may be permitted to move without moving the carriage, substantially as described.

11. In a shingle-sawing machine, the combination, with a sliding carriage, an oscillating crank-arm connected to the same, and the stop which serves as a fulcrum to said arm, of the lever-shifting mechanism in the line of movement of the carriage, by which the stop may be withdrawn.

12. In combination with the sliding carriage of a shingle-machine, its driving crank-arms, and connections from the arms to said carriage, a stop serving as fulcrums for said crank-arms, a rock-shaft by which said stop is operated, and a train of levers, substantially such as described, having a bearing which is shiftable into or out of the line of movement of the carriage, by which said stop may be withdrawn when the carriage completes its backward movement.

13. In a shingle-sawing machine, the sliding carriage, crank-arms and connections therefrom to the carriage, stops serving as fulcrums to said crank-arms, a rock-shaft by which said stops are operated, an arm and connections to said rock-shaft, and a lever by which said arm may be shifted into or out of the path of movement of the carriage, as set forth.

14. In a shingle-sawing machine, the combination, with the sliding carriage, its crank-arm, and the driving mechanism and connections, of a projection from one end of said crank-arms, a curved slot into which said projection enters, and a removable stop in said curved slot, which when in the slot serves as a fulcrum on which the crank-arm rocks.

15. In a shingle-sawing machine, the carriage-driving shaft having crank-pin, a slotted crank-arm, and an expansible slide-piece in the slot in said arm which the crank-pin enters.

16. In a shingle-sawing machine, the combination, with the sliding carriage, the slotted crank-arms and connections, and the driving crank-pins, of an expansible slide-piece in the slot of the crank-arms, which is the seat for said crank-pins, said slide-piece composed of a plurality of wedge-shaped sections and a screw which adjusts these sections relatively to each other.

17. A shingle saw carriage consisting of a single rectangular casting having integral side guides, a flat top, and depending sides, which sides have integral guideways for the holding-dogs running in a direction crosswise of the machine-frame, substantially as described.

18. A shingle-saw carriage consisting of a single rectangular casting having integral side guides beveled on one face, a flat top, and depending sides having ribs running crosswise of the machine, in combination with the guideways on the frame, having inclined bearing-faces, said guideways being adjustable toward each other, substantially as described.

19. In combination with the saw-carriage, a metallic guard depending below the dogs, having a surface toward the saw of a width greater than the distance between saw-teeth.

20. In combination with the carriage and its holding-dog, a guard depending below the dog and teeth attached to the dog and extending in opposite directions from the holding-teeth.

21. The combination, with a shingle-bolt carriage, of a holding-dog, an arm attached to said dog and bent at a right angle to extend alongside the carriage, a spring on said arm by which the dog is actuated, and a nut engaging the arm and bearing on the spring to regulate the tension thereof, a bell-crank lever pivoted to the arm and to the carriage, and a bearing for said lever on the main frame, substantially as described.

22. The combination, with the pivoted tilt-table, of the oscillating beam having risers secured thereto at each side of the pivotal support of said table and adapted to support the table, substantially as described.

23. The combination of the tilt-table, the supports on the frame, and an intermediate movable piece bearing on said supports and table, by the movement of which the height of the table may be adjusted, substantially as described.

24. In combination with the carriage of a shingle-sawing machine, a sliding dog, a cross-shaft parallel with the dog and bearing against the same, rigid arms on the cross-shaft pivotally connected to the carriage, and a draw-rod and lever for actuating said shaft, substantially as described.

25. In a shingle-sawing machine, the combination, with a pivotal tilt-table, of a walking-beam, a riser at each side of the pivot of the walking-beam, the riser at the elevated end of the walking-beam serving as a support for the elevated end of the tilt-table, and an adjustable support on the frame at each side of the tilt-table, one of these supports sustaining the depressed end of the table, substantially as described.

26. In a shingle-sawing machine, a tilt-table having a rolling and vertically-sliding movement on a ball-bearing, in combination with the frame having a socket for said ball.

27. In a shingle-sawing machine, the combination of a tilt-table, its supporting-post secured to said table and extending below the bearing, a ball-bearing on said post, and an adjusting-screw operating laterally against the post below the bearing.

28. In combination with an overhanging tilt-table mounted on a yoke, one arm of which forms a post secured to the table and having a ball-bearing thereon, said arm extending below the bearing, an adjusting device operating against the side of the post opposite the overhang.

29. The combination, with the frame, of a tilt-table supported thereon in a universal bearing, and having a pendent part below the bearing by which the tilt may be effected, end supports for the table, and a sliding piece between the end supports and the table by which the height of the table may be regulated.

30. A saw-carriage, a spring-actuated dog at one end of said carriage, an adjustable dog at the opposite end of said carriage, said adjustable dog having side wings engaging with the carriage, and a shaft in rear of and parallel with said dog, the shaft having rigid arms pivotally connected to the frame of the carriage and being operatively connected at one end with a dog-moving lever, the parts being relatively arranged and combined substantially as stated.

31. The combination, with the tilt-table having an inclined under surface and a bearing-piece with upper inclined surface, and the table-supports, of an adjusting screw whereby the position of the bearing-piece is regulated, substantially as described.

32. The combination, with the tilt-table and its sustaining-post extending below but balanced on ball-bearing, of an oscillating beam and risers therefrom which support the tilt-table.

33. The combination, with the tilt-table balanced on a ball-bearing, of an oscillating beam and adjustable risers therefrom, which bear against the under surface of the tilt-table, and separate risers on the frame independently adjustable, substantially as described.

34. In combination with the tilt-table sustained on a universally-movable standard, an adjustable support at each side of said standard, and also a separate alternately rising and falling support at each side of the standard.

35. The tilt-table, its ball-and-socket support, and a post extending below said socket, an oscillating beam pivoted under the table, and risers from said oscillating beam which support the sides of the table, all combined substantially as described.

36. The tilt-table and its oscillating beam, the cam actuated from the carriage to move said beam, and a stop engaging said cam to overcome its momentum.

37. The combination of the tilt-table and its oscillating beam, the ratchet-cam engaging said beam, the pawl actuating the cam, and a pivoted catch engaging the cam when the pawl is stopped, but lifted by the pawl in its forward movement to free the cam, as set forth.

38. The tilt-table and its oscillating beam, the ratchet-cam engaging said beam and having depressions in its faces into which the bearing of the beam falls in addition to its cam-surfaces, the locking-catch engaging the cam, the pawl, and the connection from pawl to shingle-carriage, as set forth.

39. The combination, with the carriage-moving shaft of a shingle-sawing machine, of a bearing-box surmounting the same, and a lever pivotally connected to the frame bearing on the cap of said box.

40. The combination, with the carriage-moving shaft of a shingle sawing machine, of a box surmounting said shaft, a lever pivotally connected to the frame bearing on said box, and a screw and set-nuts by which said lever may be held in adjusted position, as set forth.

41. The combination of the frame and carriage sliding thereon, the tilt-table, its oscillating beam, and a ratchet-and-cam mechanism engaging the oscillating beam, and a connecting-piece between the carriage and the ratchet mechanism, such piece being attached to the carriage and the ratchet mechanism in position to arrive at a perpendicular just before the completion of the backward movement of the carriage, substantially as stated.

42. The combination, with the tilt-table and supports beneath the same, of an interposed adjustable piece whereby the height of the table above its supports may be regulated, as set forth.

In testimony whereof I affix my signature in presence of two witnesses.

WILLIS J. PERKINS.

Witnesses:
L. P. EDDY,
DANIEL M. WETZELL.